United States Patent Office 3,850,850
Patented Nov. 26, 1974

3,850,850
METHOD OF MAKING A METHANOL SYNTHESIS CATALYST
Bruce Moffatt Collins, Stockton-on-Tees, England, assignor to Imperial Chemical Industries Limited, London, England
No Drawing. Filed Jan. 15, 1973, Ser. No. 323,349
Claims priority, application Great Britain, Jan. 21, 1972, 3,007/72
Int. Cl. B01j 11/06, 11/22
U.S. Cl. 252—465       7 Claims

ABSTRACT OF THE DISCLOSURE

A catalyst precursor is made by forming a first precipitate comprising oxides capable of reacting together to form a mixed oxide having the spinel structure, forming a second precipitate comprising a copper compound decomposable to oxide, and mixing the two precipitates. Such a precursor may after reduction be used as a methanol synthesis catalyst capable of long-term use at a high level of catalytic activity.

---

This invention relates to a method of making a catalyst and catalyst precursor, and a methanol synthesis process using the catalyst. In our co-pending U.S. application Ser. No. 227,607, there is described and claimed a methanol synthesis catalyst precursor comprising copper oxide and a support comprising the oxides of at least one divalent metal capable of forming a mixed oxide having the spinel structure characterised by the presence of spinel in crystallites not larger than 120 angstrom units. That application further describes and claims a method of making a catalyst precursor, by co-precipitating from aqueous solution thermally decomposable compounds of at least one divalent metal and one trivalent metal whose oxides are capable of forming together a mixed oxide having the spinel structure, then precipitating one or more copper compounds from aqueous solution in the presence of the first-formed precipitate, washing the whole precipitate and calcining it to give the metal oxides.

We have now discovered a simpler method of making catalyst precursor preferably but not essentially containing the specified spinel, and a new precursor and catalyst.

According to the invention a method of making a catalyst precursor comprises forming a first precipitate comprising compounds, thermally decomposable to oxides, of at least one divalent metal and at least one trivalent metal whose oxides are capable of forming together a mixed oxide having the spinel structure, forming a second precipitate comprising one or more copper compounds thermally decomposable to oxide, and mixing the two precipitates.

There follow the normal steps of drying and calcination to give the oxides and possibly to effect spinel formation. Before or after drying or calcination the precipitate is formed into pieces, for example, pellets for use in in a fixed catalyst bed. Finally before use the precursor is subjected to a reduction treatment to produce an active catalyst containing copper in metallic form.

Since the catalyst is primarily for methanol synthesis it will be appreciated that metals which interfere with methanol synthesis, such as iron, cobalt and nickel, should not be present. The support and first-formed precipitate may themselves include copper compounds but it is preferred that they do not, or at least that not more than a small proportion, for example up to about 10% of copper (by metal atoms), is incorporated into the catalyst in this way.

The divalent metal is preferably zinc, but other metals such as manganese of magnesium can be used. The trivalent metal is preferably aluminium or chromium, especially aluminium.

As well as having the advantage of simplicity the method enables catalyst precursors and catalysts to be made having a greater content of zinc-aluminium spinel than could be conveniently achieved using the method of our previous application. The higher content of spinel results, it appears, in lengthened catalyst life in methanol synthesis. Catalyst precursors and catalysts in which more than 20% by weight of the combinable zinc oxide and aluminium oxide present are in spinel form are especially valuable and constitute a further feature of the invention since they do not appear to have been specifically described before. Preferred extents of such spinel formation are over 30%, especially in the range 50–95%. Preferred proportions of copper oxide and zinc oxide in the precursor or catalyst are set out hereinafter.

The relative proportions of the two spinel-component metals in the support or in the first precipitation are preferably within about 10% of the ratio required to form the spinel. It is to be understood that since two or more divalent or trivalent metals can be used, the above-mentioned ratio takes into account the possibility of mixed spinels.

It is preferred that zinc oxide should be intimately associated with the copper oxide in the precursor, that is, that in the preferred embodiment the support carries zinc oxide as well as comprising it. Hence in the second precipitation it is preferred to have zinc compounds participating; and other metal compounds, such as of magnesium, aluminium, chromium or manganese, may be present, preferably in addition to zinc, not instead of zinc. It is preferable, however, to use copper and zinc only. In any event it appears to be advantageous to have at least one divalent metal compound common to both the first and at the second precipitation. Very suitably this common metal is zinc. The content of copper oxide is preferably from 2 to 5 times by weight of the quantity of zinc oxide in the second precipitate, that is, carried by the support.

The copper content of the catalyst precursor can lie anywhere within a wide range for example 3–80%. However, for an optimal combination of initial activity and stability at pressures above 150 ata., a copper content of 8–40% is preferred, especially 15–25%. The zinc content is then preferably 1–4 times the copper content. For an optimal combination of initial activity and stability at pressures below 150 ata., a copper content of 25–75% is preferred, especially 40–65%, the zinc content being then preferably 0.4 to 2.0 the copper content. These percentages are by metal atoms on the total of the constituents introduced by precipitation.

The precursor or catalyst may additionally contain support materials added as powdered or separately precipitated solids such as alumina for the purpose of dilution, controlling pellet density and providing other mechanical requirements, for example inhibition of shrinkage while in use. These may be added at any convenient stage of catalyst preparation, for example to any one of the solutions used in co-precipitation, to the washed or unwashed precipitate or to the metal oxides after calcination.

Either precipitation may be effected in more than one stage and more than one pair of precipitates can be used if desired.

In the method for making the catalyst the reaction conditions for each precipitation should be carefully controlled. For the second precipitation, and preferably also for the first, the temperature is preferably in the range 50–100, especially 70–100° C., and the pH of the slurry after the precipitation reaction has just been completed should be preferably between 1 unit on the acid side of neutrality and 2 units on the alkaline side; but a better catalyst results if the pH is within 0.5 unit of neutrality. (The pH for the reaction is defined in this way rather than by a pH number because the pH of neutrality varies with temperature, being about 7.0 at 25° C. and 6.6 at 50° C. for example, according to Harned and Hamer J.A.C.S., 1933, 55, 2179–2206, and thus well below 7.0 in the especially preferred precipitation temperature range 70–100° C.)

When the metal oxide constituents are introduced by way of salts in which the metals are present as cations, the precipitant with which they are reacted is preferably a carbonate or bicarbonate of an alkali metal. When the said metals form anion-salts, these may be used to introduce the metals; in particular aluminum oxide is conveniently introduced as sodium aluminate. Anionic and cationic sources may be used in combination if desired. Other methods of precipitating the copper or zinc, such as by double decomposition or thermal decomposition of amine compounds, can be used.

It is important to wash the precipitates thoroughly if they contain compounds of alkali metals, preferably to an extent that the alkali metal content of the catalyst precursor in oxide form is less than 0.2%, especially less than 0.1% calculated as sodium oxide. The precipitates may be washed separately before mixing them together, or one or more of them may be washed after mixing. A washing step may be employed after the calcination mentioned below.

Either precipitate may be dried or calcined before mixing with the other, but it is preferred to mix them in the presence of water. Most conveniently they are mixed while fresh and wet. Precipitations are in any time-order or simultaneous.

After mixing, the precipitates are usually dried under mild conditions, for example overnight at 110° C., then calcined at for example 300° C. The calcination can be sufficient to convert the metal compounds to oxides wholly or only partly. The formation of catalyst shapes is suitably by dry-compression in the presence of a lubricant such as graphite. It may be effected using uncalcined, partly calcined or fully calcined mixed precipitate.

Reduction of precursor to give the catalyst is carried out suitably at temperatures below 250° C., with the well-established precautions, such as using very dilute reducing gas or indirect cooling, to prevent over-heating.

The methanol synthesis process using catalyst made by reduction of the precursor is generally similar to that described in the above-mentioned application.

It is preferred to use a mixture of carbon monoxide and carbon dioxide in the gas in contact with the catalyst. The partial pressure of carbon dioxide in this gas is preferably over 0.1 atmosphere, especially in the range 1–3 ata. The percentage by volume of carbon dioxide in this feed gas is preferably between 0.5 and 20, especially between 3 and 12%, at pressures up to 150 ata., proportionally less at higher pressures. The percentage of the carbon dioxide can be equal to, or greater or less than, that of the carbon monoxide. It is preferred to use as the source of synthesis gas for the process a hydrocarbon-steam primary reforming process operated at a temperature and pressure which will give the required gas mixture; the synthesis gas so produced is substantially freed of the excess steam which it initially contains but is fed to the methanol synthesis plant system preferably without removal of carbon dioxide. Alternatively the synthesis gas can be made by partial oxidation of methane. As a further alternative the excess hydrogen produced by reforming natural gas and left over can be used after methanol synthesis for other purposes such as ammonia synthesis, hydroisomerisation and other petrochemical operations, or even burnt as a fuel, for example in the reforming furnace.

The synthesis gas should be substantially sulphur-free, that is, should preferably not contain more than about 1 p.p.m. by weight of sulphur. If gas containing less than 0.1 p.p.m. of sulphur can be obtained, this is still more advantageous. Such low sulphur contents are very conveniently reached, when using liquid feedstocks, by the process of our U.K. specification No. 902,148. The susceptibility of copper-containing catalysts to poisoning, and the usefulness of "guard catalysts" in conjunction with them, are well known.

The ratio by moles of carbon oxides to hydrogen in the gas in contact with the catalyst is preferably between the stoichiometric ratio and 1:10. It appears that a faster reaction results from having more than the stoichiometric proportion of hydrogen in the gas which contacts the catalyst. Preferably, in order to make use of this higher rate of reaction the ratio is between 1.3 and 3 times the stoichiometric ratio. On the other hand the process operates satisfactorily and produces good quality methanol at ratios at or not much below the stoichiometric.

The total combination process involving synthesis gas generation and methanol synthesis constitutes a unitary industrial process and in itself is a further feature of the invention. Preferably, the steam raised by the waste heat boilers in which crude synthesis gas is cooled feeds turbines driving the synthesis gas compressor and circulator.

The temperature at which the process is operated is preferably in the range 160–300° C. especially 190–270° C.

The volume space velocity at which the process is operated is preferably more than 2000 hr.$^{-1}$. and is suitably much higher, for example up to 50,000 hr.$^{-1}$ especially 5,000 to 25,000 hr.$^{-1}$. These space velocities are on the basis of a pressure of 1 atmosphere absolute and a temperature of 20° C.

The process can be operated as a multistage once-through process: if it is, then it is preferred to remove methanol as well as to adjust the temperature between the stages. Preferably however a recycle system, in which unconverted reactants are recycled to the methanol synthesis after removal of methanol from the gas leaving the catalyst, is used. Such a system can include more than one stage of methanol synthesis and removal in the recycle loop. If it is desired, in a recycle system, to keep up the ratio of hydrogen to carbon oxides to the above-stoichiometric levels mentioned above, it follows that the gas recycled can contain a higher hydrogen to carbon oxides ratio than the synthesis gas supplied to the system. In any process according to the invention, temperature control in or between synthesis converters can be any suitable method, for example feed gas preheaters, coolers or quenches; and the preferred operating conditions make it possible to use very economical reactor designs.

Catalyst made by the present method is especially suitable for methanol synthesis process at a substantially higher pressure than was exemplified in that application, for example 150–600 ata. The catalyst is thus suitable as a replacement for zinc-chromite catalysts in high-pressure methanol plants, after modification to lower the operating temperautre to the levels appropriate to copper-containing catalysts. The methanol output can be in the range 0.5 to 4 kg. for example 0.5 to 2.0 kg. per litre of catalyst per hour.

In the following Example the parts are by weight.

EXAMPLE 1

Preparation of catalyst

To a solution of 50 parts of sodium aluminate (85% pure) in 700 parts of water at 65° C. there was added a solution of zinc nitrate (17 parts of zinc), followed by sufficient 54% nitric acid to bring the slurry to neutrality. From a second vessel a solution of copper nitrate (13.2 parts of copper) and zinc nitrate (4.5 parts of zinc) in 277 parts of water at 65° C. were run into a stream of sodium carbonate solution at a rate such as to produce a slurry at a pH of 6.5, which is mildly alkaline at this temperature. The latter slurry was run into the vessel containing the former slurry. The combined slurry was stirred for 1 hour at 65° C.. The precipitate was collected on a filter and washed with water. The filter cake was dried at 110° C., then calcined to oxides at 300° C. The weight percentage composition of the oxides was, after allowing for volatiles removable at 900° C:

| | |
|---|---|
| CuO | 24 |
| ZnO | 38.0 |
| $Al_2O_3$ | 37.6 |
| $Na_2O$ | 0.1 |

Miscellaneous impurities 0.3.
(Volatiles were 13.0).

The proportion of the total oxides present as zinc aluminium spinel was 45%, that is, 67% of the combinable zinc oxide and alumina. The spinel crystallite size was about 35 angstrom units; in order to find these data the copper oxide and free zinc oxide were first dissolved away with dilute hydrochloric acid to isolate the insoluble spinel.

The composition by metal atoms was thus Cu 20, Zn 32, Al 49. The oxides were compressed into pellets in the form of cylinders 3.6 mm. high by 5.4 mm. diameter.

Test of the catalyst

Before starting the test the pellets of catalyst precursor were reduced carefully with dilute hydrogen raising the temperature slowly to 230° C.

The synthesis gas for this run was made by reacting a desulphurised naphtha (boiling range 30–170° C., sulphur content 0.1 p.p.m. w./w.) with steam at a steam ratio of 3.0, a temperature of 800° C. and a pressure of 200 p.s.i.g. over a nickel-magnesia-kaolin-cement-potash catalyst. The volume percentage composition of the synthesis gas was $CO_2$ 2.1, CO 17.3, $H_2$ 66.6, $CH_4$ 1.8 and $N_2+Ar$ 12.2 and thus it was close to the stoichiometric composition for methanol synthesis. It was cooled to remove excess steam, then compressed to 350 ata. and fed to a synthesis loop employing recycle and operated with a purge such that the volume percentage composition of the mixture of fresh gas and recycled gas was $CO_2$ 0.6, CO 4.0, $H_2$ 66.8, $CH_4$ 3.0 and $N_2+Ar$ 25.6. The space velocity of the gas mixture over the catalyst was 12000 volumes of gas per volume of catalyst-filled space per hour, calculated to 20° C. and 760 mm. Hg pressure. The methanol synthesis reactor was of the quench-cooled type and was operated at an average temperature of 226° C. initially, giving a rate of production of methanol of 0.7 kg. per hour per litre of catalyst. The temperature was increased gradually in order to maintain this output, until 10 weeks later when at 259° C. no significant further increase was needed: thus the catalyst is highly stable.

The crude methanol product contained 10% v./v. of water and under 1000 p.p.m. of organic impurities.

In other tests, at 50 ata. and at 100 ata., the catalyst was also found to be highly active and stable.

EXAMPLE 2

The catalyst preparation described in Example 1 was repeated except that the quantities were adjusted to give an oxide composition containing about 60% by metal atoms of copper: the composition by analysis was in fact Cu 59.8, Zn 25.6, Al 14.6. The proportion of zinc aluminium spinel, determined by the same method as in Example 1, was 12.4% by weight, corresponding to 75.3% of the possible spinel content.

For an activity test the oxide pellets were crushed and a sample passing a BSS 18 but not 25 sieve selected and charged to a small laboratory reactor. The oxides were reduced at atmospheric pressure by a gas consisting of 10% CO, 10% $CO_2$ and 80% $H_2$, by volume, raising the temperature slowly to 250° C.

Methanol synthesis was carried out at 50 ata. pressure using the same gas at 250° C. at a space velocity of 40000 hour $^{-1}$. The catalyst activity, measured as the volume percentage of methanol appearing in the outlet gas per gram of catalyst, was 4.19.

What is claimed is:

1. A method of making a catalyst precursor which method comprises forming a first precipitate comprising compounds, thermally decomposable to oxides, of at least one divalent metal from the group consisting of zinc, manganese, and magnesium and at least one trivalent metal from the group consisting of aluminum and chromium whose oxides are capable of forming together a mixed oxide having the spinel structure, forming a second precipitate comprising one or more copper compounds thermally decomposable to oxides, washing, drying and calcining the two precipitates to form the metal oxides, the two precipitates being mixed either prior to or subsequent to calcining.

2. A method according to claim 1 in which the divalent metal is zinc.

3. A method according to claim 1 in which the second precipitate comprises a zinc compound.

4. A method according to claim 1 in which the precursor is of a catalyst to be used in methanol synthesis at pressures above 150 ata., and the proportion of copper by metal atoms on the total of the constituents introduced by precipitation is in the range 8–40%.

5. A method according to claim 4 in which the zinc content is 1–4 times the copper content by metal atoms.

6. A method according to claim 1 in which the precursor is of a catalyst to be used at pressures below 150 ata., and the proportion of copper by metal atoms on the total of the constituents introduced by precipitation is in the range 25–75%.

7. A method according to claim 6 in which the zinc content is 0.4–2.0 times the copper content by metal atoms.

References Cited

UNITED STATES PATENTS

| | | | |
|---|---|---|---|
| 2,444,509 | 7/1948 | Ipatieff et al. | 252—463 X |
| 3,388,972 | 6/1968 | Reitmeier et al. | 252—463 X |
| 2,677,649 | 5/1954 | Kirshenbaum et al. | 252—463 X |
| 3,600,429 | 8/1971 | Kronig et al. | 252—466 PT |
| 3,641,182 | 2/1972 | Box et al. | 252—466 PT |

DANIEL E. WYMAN, Primary Examiner

W. J. SHINE, Assistant Examiner

U.S. Cl. X.R.

252—463, 467, 468, 471, 475, 476; 260—449.5